US012763276B2

(12) United States Patent
Reuter et al.

(10) Patent No.: US 12,763,276 B2
(45) Date of Patent: Oct. 13, 2026

(54) ACTUATOR ASSEMBLY FOR ELECTRICAL DEVICES AND METHODS OF MAKING

(71) Applicant: Sensata Technologies, Inc., Attleboro, MA (US)

(72) Inventors: Calvin S Reuter, Cumberland, RI (US); Matthew C Ryder, Holliston, MA (US); Ronny Vasquez, Camarillo, CA (US)

(73) Assignee: Sensata Technologies, Inc., Attleboro, MA (US)

( * ) Notice: Subject to any disclaimer, the term of this patent is extended or adjusted under 35 U.S.C. 154(b) by 221 days.

(21) Appl. No.: 18/648,308

(22) Filed: Apr. 26, 2024

(65) Prior Publication Data

US 2025/0336630 A1 Oct. 30, 2025

(51) Int. Cl.

| | |
|---|---|
| ***H01H 50/64*** | (2006.01) |
| ***H01H 49/00*** | (2006.01) |
| ***H01H 50/20*** | (2006.01) |
| ***H01H 50/44*** | (2006.01) |
| ***H01H 50/54*** | (2006.01) |

(52) U.S. Cl.

CPC .......... *H01H 50/641* (2013.01); *H01H 49/00* (2013.01); *H01H 50/20* (2013.01); *H01H 50/44* (2013.01); *H01H 50/54* (2013.01)

(58) Field of Classification Search

None

See application file for complete search history.

(56) References Cited

U.S. PATENT DOCUMENTS

| | | | | |
|---|---|---|---|---|
| 8,446,239 B2 * | 5/2013 | Niimi | ..................... | H01H 50/22 335/131 |
| 2024/0120165 A1 * | 4/2024 | Otsuka | ................. | H01H 50/045 |
| 2025/0336629 A1 * | 10/2025 | Reuter | ................. | H01H 50/546 |

FOREIGN PATENT DOCUMENTS

| | | |
|---|---|---|
| EP | 2291851 B1 | 8/2017 |
| EP | 4276856 A1 | 11/2023 |
| WO | WO2010066536 A1 | 6/2010 |
| WO | WO2017204834 A1 | 11/2017 |
| WO | WO2020169562 A1 | 8/2020 |

OTHER PUBLICATIONS

Extended European Search Report for European Application No. 25172650.1, dated Oct. 14, 2025, 7 pages.

* cited by examiner

*Primary Examiner* — Bernard Rojas

(74) *Attorney, Agent, or Firm* — Lee & Hayes, P.C.

(57) ABSTRACT

An electrical device includes an actuator assembly configured to facilitate selective opening/closing of an electrical circuit. A plunger is positioned to be acted on by a magnetic field, a shaft is coupled to the plunger, and a movable contact is coupled to the shaft. The plunger includes an axial opening and an undercut formed in a surface defining the axial opening. The shaft is inserted into the opening and an end of the shaft extending from the opening is altered to increase a diameter of the shaft to prevent passage through the opening and such that a portion of the shaft extends into the undercut.

20 Claims, 3 Drawing Sheets

ACTUATOR ASSEMBLY FOR ELECTRICAL DEVICES AND METHODS OF MAKING

FIELD OF THE TECHNOLOGY

The subject disclosure relates to electrical switching devices, such as contactor devices and electrical fuse devices, and more particularly to improved actuator assemblies for such devices having a plunger coupled to a shaft and methods of making those assemblies.

BACKGROUND OF TECHNOLOGY

Many conventional devices are known to selectively power on or off electrical devices. Electrical contactors, e.g., high-voltage DC contactors, and fuses, e.g., electrical fuses and/or pyrotechnic fuses, are conventionally available and used in electrical systems. Contactors may be configured to interrupt or complete a circuit to control electrical power to and/or from a device.

In many conventional systems, a contactor is configured as a switch, e.g., to selectively allow/disallow current flow. In some examples, one or more movable contacts may be coupled to a shaft. In these examples, the shaft may be movable, e.g., by an actuator, to selectively move the movable contact(s) into and out of contact with one or more fixed contacts. In some examples, a plunger may be coupled to the shaft. The plunger is placed in a magnetic field, e.g., of an electromagnetic coil. Selective activation of the electromagnetic coil causes the plunger (and thus the shaft and the movable contact(s)) to move relative to the coil. In some conventional examples, the plunger may be attached to the shaft using clips, welding, threaded interfaces, formed attachments, and/or the like. However, conventional techniques for securing the plunger to the shaft may suffer fatigue and/or failure. Also in examples, conventional fastening techniques may not allow for precise dimension control in the electrical device.

Accordingly, there is a need in the art for improved actuator assemblies for electrical devices that include a shaft and a plunger attached to the shaft. There also is a need in the art for improved methods of making such assemblies.

SUMMARY OF THE TECHNOLOGY

The subject technology relates to improved electrical devices and methods of making and using those devices. In examples, aspects of this disclosure relate to improved switching devices with actuator assemblies that include a shaft and a plunger affixed to the shaft. For example, aspects of this disclosure can relate to features and/or systems that include a plunger having an undercut and a shaft fixed to the plunger using the undercut. This reduced rotation may result in improved alignment of the movable contact with fixed contacts, e.g., to ensure proper functioning of the contactor. In other examples, aspects of this disclosure may relate to reducing wear on housings and/or other components of electrical devices, e.g., caused by rotation of the movable contact. This reduced wear may result in longer life of the contactor, thereby requiring less frequent maintenance and/or replacement.

BRIEF DESCRIPTION OF THE DRAWINGS

So that those having ordinary skill in the art to which the disclosed systems and techniques pertain will more readily understand how to make and use the same, reference may be had to the following drawings.

DETAILED DESCRIPTION

Figure 1:
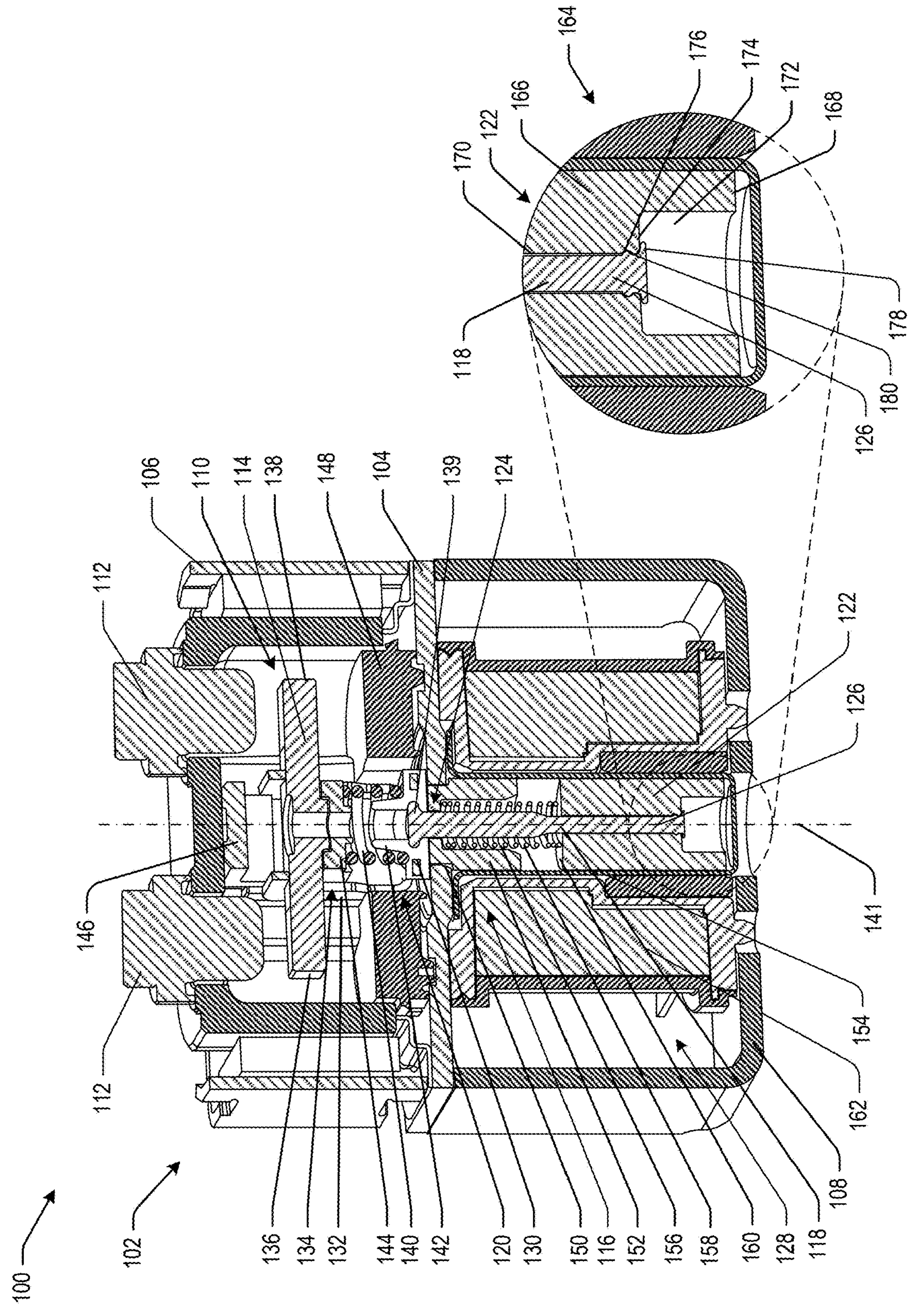
FIG. 1 is a perspective, section view of an electrical device, including a housing and electrical components, in accordance with aspects of this disclosure.

The subject technology overcomes prior art problems associated with electrical devices. In brief summary, the subject technology provides improved electrical devices including a contactor design that may have improved performance and/or longer functional life compared to other conventional electrical devices. In examples, the electrical device may have two discrete operation states, including a first operating state and a second operating state. In the first operation state, the device is open, e.g., such that no voltage or current flows through the device. In the second operating state, the device is closed. In examples, the electrical device can include a coil that is energized to cause one or more movable contacts to move into contact with one or more fixed or stationary contacts, thereby completing a circuit, e.g., to configure the device in the second operating state. In the second operating state, current, e.g., from a high voltage source, may flow through the device.

In aspects of this disclosure, the electrical device includes an actuator assembly that cooperates with the coil to selectively configure the electrical device in the first or second operating state, e.g., by cycling the movable contact relative to the fixed contact(s).

In some aspects of this disclosure, an actuator assembly includes a shaft, a movable contact, and a plunger. In examples, the shaft extends from a first end to a second end generally along an axis. The movable contact is coupled to the first end of the shaft and the plunger is coupled to the second end of the shaft. In examples, the includes an axial opening extending through the plunger and an undercut formed in an inner surface defining the axial opening. Also in examples, the shaft extends through the axial opening and a portion of the shaft extends laterally into the undercut to secure the shaft to the plunger.

Aspects of this disclosure also relate to methods of manufacturing an actuator assembly. For example, a method according to this disclosure may include providing a shaft and providing a plunger. The shaft may extend from a first end to a second end, generally along an axis. The plunger may have a body, an axial opening extending through the body, and an undercut formed in an inner surface defining the axial opening. For example, the undercut may be formed proximate a lower surface of the plunger. Methods according to this disclosure can also include positioning the shaft relative to the plunger with the shaft extending through the axial opening and machining the end of the shaft proximate the plunger. The machining may form an increased diameter portion proximate the end and cause a portion of the shaft to extend into the undercut.

Without limitation, the devices and techniques described herein may provide improved electrical devices, which may be less complex, may be cheaper to manufacture and/or use, may be more robust, and/or may be more precise when compared to similar conventional systems. In some examples, using the devices and techniques described herein can also or alternatively allow for use of simpler and/or cheaper components in an electrical device. For example, because manufacturing processes described herein may enable more precision positioning of a plunger relative to other components of the actuator assembly, the need for intricate and complex assemblies that accommodate conventional tolerance variances may be unnecessary.

While aspects of this disclosure may be particularly useful in certain applications, like DC contactors for use in high voltage electrical systems, the systems and techniques described herein may be useful with any electrical devices that incorporate movable contact members carried by a shaft coupled to a plunger.

Aspects of the disclosure will now be explained in more detail with reference to the Figures.

FIG. 1 is a cross-sectional view of an electrical device 100. In examples of this disclosure, the electrical device 100 may be a switch or contactor assembly, such as a DC contactor. In other examples, the electrical device may be a hybrid device, e.g., that includes a fuse or disconnect (such as a pyrotechnic disconnect). As will be appreciated from this disclosure, aspects of this disclosure may be used with any device that incorporates an actuator assembly that includes a shaft and a plunger fixed to the shaft.

In the illustrated example, the electrical device 100 includes an electrical device housing 102. The housing 102 includes a housing base 104 disposed between an upper housing portion 106 and a lower housing portion 108. In the example of FIG. 1, the upper housing portion 106 is configured to cooperate with the housing base 104. In examples, the switch assembly housing base 104 and portions of the upper housing portion 106 may be metal parts, e.g., steel parts, welded to each other. The upper housing portion 106 defines, at least in part, an upper housing volume 110. In some examples, the upper housing volume 110 may be a hermetically-sealed volume. An electronegative gas may be contained in the upper housing volume 110. This hermetically sealed configuration can help mitigate or prevent electrical arcing between adjacent conductive elements, and in some embodiments, helps provide electrical isolation between conductive contacts, as detailed further herein. In some examples, the upper housing volume 110 can be under vacuum conditions, and can be hermetically sealed using known means of generating hermetically sealed electrical devices.

Features of the electrical device 100 are disposed in the upper housing volume 110. For example, the view of FIG. 1 shows two fixed contacts 112 coupled to the upper housing portion 106. The fixed contacts 112 are disposed partially in the upper housing volume 110 and are configured to electrically connect internal components (detailed further herein) of the electrical device 100 to external circuitry, for example, to an electrical system or device. For example, the fixed contacts 112 may be terminals configured to facilitate connection of first electrical leads (not shown) from a voltage source to second electrical leads (also not shown) associated with a load to be powered by the voltage source.

The electrical device 100 also includes a movable contact 114. The movable contact 114 is movable between a first position spaced from the fixed contacts 112 and a second position contacting the fixed contacts 112. The first position is shown in FIG. 1, and the movable contact 114 may be moved upward (in the orientation of FIG. 1) from the illustrated position to the second position. In the illustrated example, the movable contact 114 is a generally elongate member that, in the second position, not illustrated but just described, can simultaneously contact both of the fixed contacts 112. Accordingly, the movable contact 114 can selectively couple the two fixed contacts 112, to facilitate current flow between the fixed contacts 112 and thus through the electrical device 100.

The electrical device 100 also includes an actuator assembly 116 configured to, among other functions, facilitate selective opening and closing of the electrical device 100, e.g., by facilitating selective movement of the movable contact 114 into and out of contact with the fixed contacts 112. In examples, the actuator assembly 116 can include the movable contact 114 and/or may be operatively coupled to the movable contact 114.

As illustrated in FIG. 1, the actuator assembly 116 is illustrated as including a shaft 118, a coupler 120, and a plunger 122.

In the example, the shaft 118 is disposed such that a first end 124 (e.g., an upper end in the orientation of FIG. 1) is positioned in the upper housing volume 110 defined by the upper housing 106 and the base 104. The first end 124 is coupled to the movable contact 114, e.g., via the coupler 120. An opposite, second end 126 of the shaft 118 extends through the base 104 into a lower housing volume 128 defined at least in part by the lower housing portion 108. The plunger is coupled to the shaft 118 proximate the second end 126 of the shaft 118. As detailed further below, specific examples of this disclosure relate to the coupling of the shaft 118 to the plunger 122 and techniques for performing such coupling.

In more detail, FIG. 1 shows that the coupler 120 includes a base 130 and opposing spaced sides 132 extending upward (in the orientation of FIG. 1) from the base 130. In this example, the opposing sides 132 define openings 134 through which portions of the movable contact 114 extend. Specifically, the movable contact 114 is a substantially elongate or bar-shaped member extending from a first end 136 to a second end 138. The movable contact 114 extends through the openings 134 in the spaced sides 132 such that the first end 136 and the second end 138 are disposed on opposite sides of the spaced sides 132 of the coupler 120 (and generally aligned vertically with the fixed contacts 112).

In the illustrated example, the base 130 of the coupler is secured to the first end 124 of the shaft 118. In examples, the base 130 may be molded onto the first end 124 of the shaft 118. For instance, the base 130 may be a polymeric material formed on the shaft 118 via an overmolding process or the like. In examples, the polymeric material may configure the base to electrically isolate the movable contact 114 from the remaining actuator components (e.g., the shaft 118) and/or portions of the housing 102 (e.g., the base 104). For instance, the movable contact 114 may be configured to conduct high voltage electricity, and the shaft 118 may be metallic or include some other conductive material. The base 130 may physically and/or electrically insulate the shaft 118 from the movable contact 114. FIG. 1 also shows that the first end 124 of the shaft 118 may terminate at a head 139.

In the illustrated examples, the sides 132 of the coupler 120 may be integrated with the base 130. For example, the base 130 may be overmolded over a bottom portion of the sides 132. However, the sides 132 may be otherwise coupled, secured, or attached to the base 130 in other examples. In the illustrated example, the sides 132 may approximate an inverted U-shape to define the openings 134 which provide clearance for the ends 136, 138 of the movable contact 114, as noted above. The movable contact 114 may be movable in the openings 134 relative to the sides 132 and the base 130.

In the example of FIG. 1, a biasing spring 140 is disposed between the base 130 and the movable contact 114. More specifically, the biasing spring 140 biases the movable contact 114 away from the shaft 118 and against a top edge of the openings 134 in the sides 132. Thus, in the illustrated example, the shaft 118 is secured to the coupler 120 (e.g., to the base 130 of the coupler 120) and the biasing spring 140 biases the movable contact 114 against the top edge of the openings 134 in the sides 132 of the coupler 120. Accordingly, movement of the shaft 118, e.g., along an axis 141 of the shaft 118, will cause corresponding movement of the coupler 120, the biasing spring 140, and the movable contact 114. For example, when the shaft 118 is caused to move downward in the orientation of FIG. 1, the movable contact 114 moves away from the fixed contacts 112. Alternatively, when the shaft 118 is caused to move upward in the orientation of FIG. 1, the movable contact 114 is moved toward, and eventually into contact with, the fixed contacts 112. Continued movement of the shaft 118 in the upward direction (in the orientation of FIG. 1) when the movable contact 114 contacts the fixed contacts 112, can result in continued travel of the coupler 120 relative to the movable contact 114, e.g., resulting from compression of the biasing spring 140. In this example, the biasing spring 140 can compensate for overtravel of the shaft 118, e.g., to prevent destructive contact of the movable contact 114 with the fixed contacts 112. In other examples, the biasing spring 140 may not be included.

As also illustrated in FIG. 1, the base 130 of the coupler 120 includes a tapered protrusion 142. In examples, the protrusion 142 may be provided to help maintain positioning and/or orientation of the biasing spring 140. For example, an outer diameter of the protrusion 142 may be similar to or slightly smaller than an inner diameter of the biasing spring 140, e.g., to limit or prevent lateral movement of the biasing spring 140 relative to the coupler 120.

FIG. 1 also shows a lower yoke 144 disposed below and in contact with the movable contact 114. In examples, the lower yoke 144 may be a metal component configured to cooperate with an upper yoke 146 to provide a metallic or conductive "ring" around the movable contact 114 when the movable contact 114 contacts the fixed contacts 112. For example, the lower yoke 144 and the upper yoke 146 may cooperate to enhance or control an electromagnetic field generated by current passing through the movable contact 114. In the example, the upper yoke 146 is coupled to the upper housing 106, e.g., such that the shaft 118, the movable contact 114, the coupler 120, and the lower yoke 144 (e.g., the actuator assembly 116) move relative to the upper yoke 146. In other examples, however, the upper yoke 146 may be coupled to the movable contact 114 and/or to the lower yoke 144.

FIG. 1 also shows an arc shield member 148. The arc shield member 148 may be a polymeric or other insulative material that acts as an insulator or barrier, e.g., in case of arcing in the upper housing volume 110 or the like. In the illustrated example, the arc shield 148 is disposed on the housing base 104 and defines an opening that generally surrounds a portion of the actuator assembly 116, e.g., the coupler 120.

The configuration of FIG. 1 is provided for example only. For example, modifications to the actuator assembly 116 are contemplated and will be appreciated by those having ordinary skill in the art with the benefit of this disclosure. For example, the lower yoke 144 and/or the upper yoke 146 may be omitted. Also, in some examples, aspects of the coupler 120 may be omitted. For instance, the shaft 118 may be coupled directly to the movable contact 114, e.g., instead of via the coupler 120. For instance, a hole may be formed the movable contact 114 and the shaft 118 may extend through the hole in one non-limiting example. In this example, the shaft 118 may include a flanged head and the flanged head may contact an upper surface of the movable contact 114. Other example arrangements also are contemplated. Any arrangement in which movement of the shaft causes corresponding movement of the movable contact 114 may be implemented.

As also shown in FIG. 1, the shaft 118 extends through the base plate 104, such that the second end 126 of the shaft 118 is disposed in the lower volume 128, defined at least in part by the lower housing portion 108. In the illustrated example, an opening 150 or hole is formed in the base 104, and the shaft 118 extends through the opening 150. In the illustrated example, the opening 150 is sized to have a diameter smaller than an outer extent of the coupler 120 (e.g., the base 130 of the coupler 120) such that the coupler 120 contacts the base 104 and does not pass through the opening 150. Also in the illustrated example, an alignment plug 152 is disposed at least partially in the opening 150. The alignment plug 152 may be configured for fitting into the opening 150, e.g., via a press fit. When present, the alignment plug 152 also defines an opening through which the shaft 118 extends.

When used, the alignment plug 152 may facilitate locating one or more additional components of the electrical device 100. For example, the alignment plug 152 extends from the opening 150 (and the base 104) into the lower volume 128. In the illustrated example, a distal end (e.g., spaced from the base 104) of the alignment plug 152 is sized to extend into a plunger tube 154. For example, an inner diameter of the plunger tube 154 and an outer diameter of the alignment plug 152 may be sized to allow for the alignment plug 152 to be disposed in the plunger tube 154. In some examples, the alignment plug 152 can be press fit into the plunger tube 154 (or the plunger tube 154 can be press fit over the alignment plug 152). As detailed further below, the plunger tube 154 can house or otherwise retain the plunger 122.

As also illustrated in FIG. 1, the alignment plug 152 may define a bore 156. The shaft 118 passes through the bore 156. Moreover, the bore 156 is sized to receive at least a portion of a return spring 158. In the example, the return spring 158 is a compression spring extending from a first end disposed in the bore 156 (and contacting an inner, bottom surface of the bore 156) of the alignment plug 152 to a second end spaced from the first end along an axis of the return spring 158. The second end of the return spring 158 contacts an upper surface 160 of the plunger 122. In the illustrated example, because the alignment plug 152 is fixed to the base 104 of the housing 102, the return spring 158 biases the plunger 122 away from the base 104, e.g., in a downward direction in the orientation of FIG. 1. Moreover, because the second (e.g., lower) end of the shaft 118 also is coupled to the plunger 122, the return spring 158 biases the shaft 118 and the movable contact 114, e.g., away from the fixed contacts 112.

The actuator assembly 116 is driven by a coil 162, e.g., a DC coil. The coil 162 may be selectively energized. For example, and as shown in FIG. 1, the coil 162 is disposed proximate the plunger tube 154. In examples, the coil 162 is a cylindrical coil that is disposed around the plunger tube 154. The plunger 122 is disposed in the plunger tube 154, and the plunger 122 is movable relative to the plunger tube 154. In examples, the plunger tube 154 may be fixed relative to the coil 162 and the plunger 122 is free to move axially relative to the plunger tube 154 (and the coil 162) in response to activation/deactivation of the coil 162. As detailed above, the plunger 122 is coupled to the shaft 118 proximate the second end 126 of the shaft 118. The return spring 158 is positioned on the shaft 118 between the upper surface 160 of the plunger 122 and a lower surface of the housing base 104 (e.g., the alignment plug 152 in FIG. 1). The return spring 158 biases the plunger 122 (and thus the shaft 118) away from the base 104, e.g., in a downward direction in FIG. 1 along the axis 141. Accordingly, when the coil 162 is not charged, the return spring 158 biases the shaft 118 (via the plunger 122) to distance the movable contact 114 from the fixed contacts 112.

Thus, as just described, movement of the plunger 122, e.g., against a bias force of the return spring 158, result in corresponding movement of the shaft 118 and the movable contact 114. Thus, aspects of this disclosure require a rigid coupling of the plunger 122 to the shaft 118 in order to open and close the electrical device 100. Moreover, in addition to robust strength, the coupling of the plunger 122 to the shaft 118 may establish a precise position of the plunger 122 on the shaft 118, which may impact the compression force applied to the return spring 158 and/or the magneto-motive force applied by the coil 162 to move the plunger 122. Conventional electrical devices have implemented various techniques for coupling plungers and shafts 118. For example, some conventional devices include clips (e.g., C-clips), weld joints, threaded arrangements (e.g., mating threads on the shaft 118 and the plunger 122), formed attachments or stops, and/or other techniques. However, these conventional attachment techniques suffer from at least one of wearing or failing over time, failing to reliably provide the required positioning of the plunger, and/or being difficult to manufacture. Aspects of this disclosure remedy many of the deficiencies of the conventional apparatuses.

A magnified portion 164 of FIG. 1 shows aspects of the attachment of the plunger 122 to the shaft 118. Specifically, the magnified portion 164 shows in detail that the plunger 122 incudes a body 166 extending generally axially between the upper surface 160 and a lower surface 168. In the example, the body 166 is substantially cylindrical, although aspects of this disclosure are not limited to a specific size or shape. A central or axial opening 170 extends from the upper surface 160 to the lower surface 168. The axial opening 170 has a diameter that is larger than an outer diameter of at least a portion of the shaft 118, e.g., such that a portion of the shaft 118 is disposed inside the axial opening 170. The second end 126 of the shaft 118 extends at least partially from the axial opening 170.

The example of FIG. 1 also includes a bore 172 formed in the lower surface 168 of the plunger 122. The bore 172 results in an offset surface 174 that is parallel to and offset from the lower surface 168. Stated differently, the bore 172 provides a widening of the axial opening 170 at the lower surface 168. The bore 172 may be optional.

As also seen in the magnified portion 164, the plunger 122 includes an undercut 176. In the illustrated example, the undercut 176 is a radiused, annular cutout that provides a widening of the axial opening 170 at a position near, but spaced from, the termination of the axial opening 170. In the example, the undercut 176 is near the offset surface 174. In instances in which the bore 172 is not provided, the undercut 176 may be proximate the bottom surface 168. Although the undercut 176 is illustrated as a single, radiused section, in other examples, the undercut 176 can have other profiles. Moreover, although only a single instance of the undercut 176 is illustrated, in other examples more than one undercut may be provided. In examples, the undercut may be any void or space at the axial opening 170.

As detailed further herein, the undercut 176 provides a space into which the shaft 118 can deform during processing of the shaft 118 to couple the shaft 118 to the plunger 122. The magnified portion 164 shows the shaft 118 after such deformation/processing. Specifically, the magnified portion 164 shows that the second end 126 of the shaft 118 includes a flared head 178. The flared head 178 is an example of an increased diameter portion of the shaft 118 that, once formed, prevents the plunger 122 from sliding off the shaft 118, e.g., at the second end 126 of the shaft. In examples, the flared head 178 may be formed from a cold forming process. For instance, the flared head 178 may be formed using a radial forming or orbital forming process. In these processes, material is acted on to displace material radially outward from a center. Thus, in the device 100, the shaft 118 may be acted on to cause material to extend radially outward to form the flared head 178. As illustrated, the flared head 178 contacts the offset surface 174. In instances in which the offset surface 174 is not used, the flared head 178 may be formed to contact the lower surface 168.

In examples of this disclosure, the process to create the flared head 178 causes deformation of the second end of the shaft 118. The process of deforming material to create the flared head 178 will also cause deformation of the shaft such that an expanded portion 180 of the shaft 118 expands into the undercut 176. Specifically, the outer surface of the shaft 118 expands during the forming process such that the material comprising the shaft 118 flows into the undercut 176 as the expanded portion 180. According to aspects of this disclosure, the expanded portion 180 and the undercut 176, as well as the flared head 178, create a rigid coupling of the plunger 122 to the shaft 118. The coupling provided may be particularly robust to a lifetime of mechanical cycling, for instance, because the coupling is formed by deforming and work hardening the shaft 118.

As just detailed, FIG. 1 shows a coupling of the shaft 118 to the plunger 122 that may provide improvements over conventional devices and techniques. Although the shaft 118 and the plunger 122 are shown as part of the actuator assembly 116, the actuator assembly 116 and the electrical device 100 are for example only. Other types of actuator assemblies and devices are contemplated. For example, and without limitation, although the example shows the coupler 120 that allows for movement of the movable contactor 114 relative to the shaft 118. The coupler 120 may be provided to account for tolerance variations associated with components of the actuator assembly 116, for example. However, the systems and techniques disclosed herein may reduce or eliminate the need to account for such variations, which may also obviate the need for the coupler 120. In such examples, the shaft 118 may be coupled directly to the first end 124 of the shaft 118, for example.

Other modifications and variations also are contemplated. For example, FIG. 1 shows a normally open contactor, e.g., such that the return spring 158 biases the movable contact 114 away from the fixed contacts 112, and the plunger 122 is actuated against a biasing force of the return spring 158 to close the circuit (e.g., by contacting the movable contact 114 to the fixed contacts 112). Aspects of this disclosure may also be applied to other contactor constructions, including normally closed contactors. In a normally closed contactor, the return spring 158 may bias the movable contact toward the fixed contacts 112 and the plunger 122 is actuated against the biasing force of the return spring 158 to open the circuit (e.g., by separating the movable contact 114 from the fixed contacts 112). Any configuration in which a plunger is coupled to a shaft may benefit from aspects of this disclosure.

Figure 2:
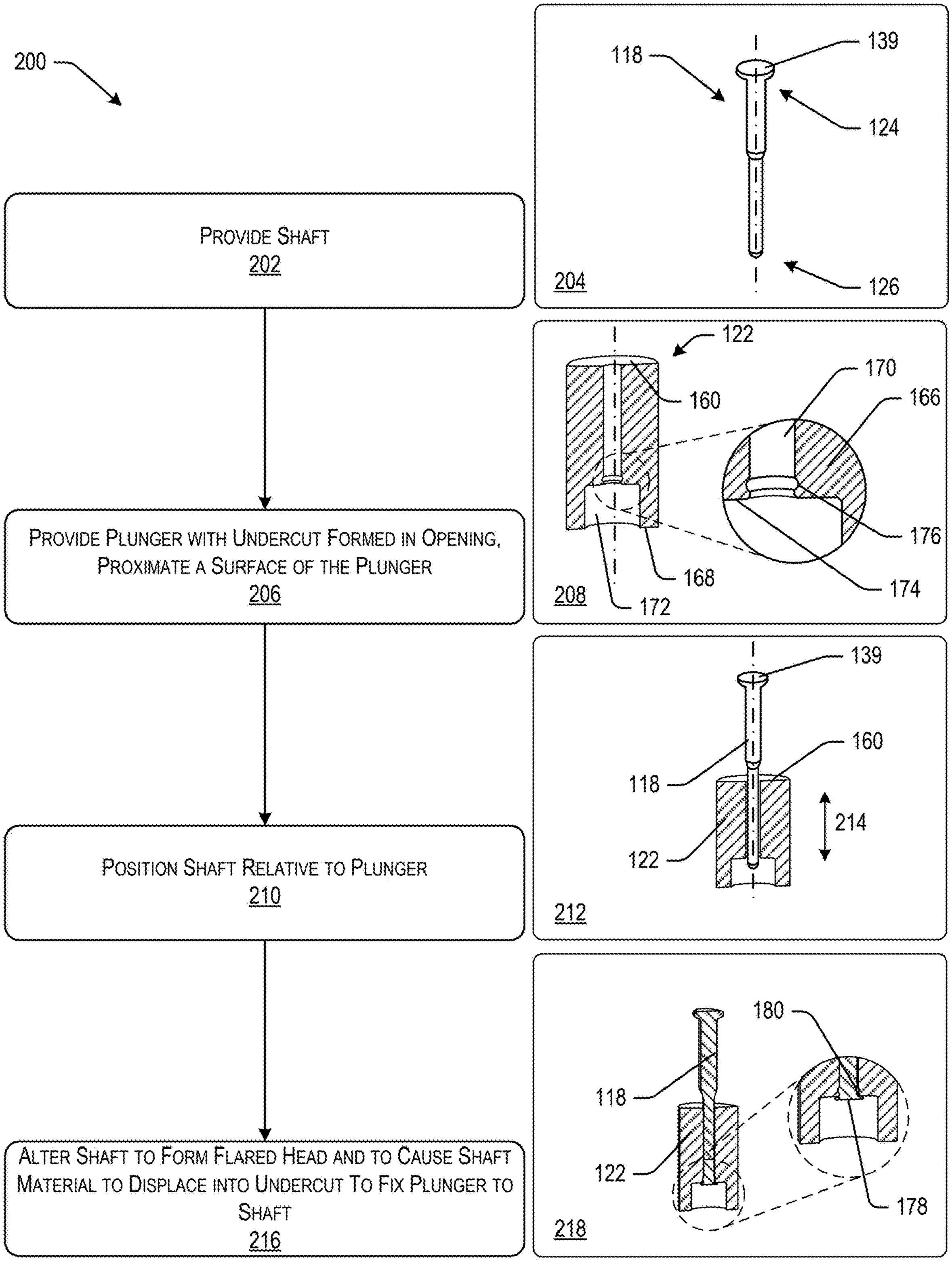
FIG. 2 includes textual and pictorial flowcharts describing and illustrating aspects of a method of making an electrical device, in accordance with aspects of this disclosure.

FIG. 2 provides textual and pictorial flow charts showing a process 200 of coupling a shaft, such as the shaft 118, to a plunger, such as the plunger 122. Although the shaft 118 and the plunger 122 are used to illustrate the process 200 in FIG. 2, other shafts and/or plungers may be joined using the process 200 . . . . In FIG. 2, features that were introduced above in connection with FIG. 1 are labeled with the same reference numerals.

At an operation 202, the process 200 includes providing a shaft. In the example 204 accompanying the operation 202, the shaft 118 is illustrated. As detailed above, the shaft 118 is generally cylindrical and extends from a first end 124 (e.g., an upper end) to a second end 126 (e.g., a lower end) along an axis. The shaft 118 is illustrated as including the head 139 at the first end 124. In examples, the head 139 may be desirable for attachment and/or securement of the coupler 120 to the shaft 118, although in other examples, the head 139 may be differently shaped or may be omitted entirely.

Also in the example 204, the shaft 118 is illustrated as having a stepped profile, e.g. such that an outer diameter of the shaft 118 is different along an axial length of the shaft 118. For example, the shaft 118 is illustrated as having a relatively larger diameter proximate the first end 124 and a relatively smaller diameter proximate the second end 126. However, the illustrated configuration of the shaft 118 is for example only. In other examples, the shaft may have more or fewer steps/diameters and/or may be stepped at a different position along the axial length. Moreover, and without limitation, the shaft 118 may instead have a relatively larger diameter proximate the second end 126 than proximate the first end 124. In still further examples, the shaft 118 may have a substantially constant outer diameter along its axial length. Moreover, although the shaft 118 is illustrated as being substantially cylindrical, e.g., with a circular cross-section, other cross-sections may be used, including but not limited to cross-sections that are polygonal, arcuate, and/or other shapes. The configuration of the shaft 118 may be based at least in part on design aspects of an electrical device into which the actuator assembly is to be incorporated.

At an operation 206, the process 200 includes providing a plunger with an undercut formed in an opening, proximate a surface of the plunger. Example 208 accompanying the operation 206 shows the plunger 122 in cross-section. As detailed above, the plunger 122 includes a plunger body 166 extending generally axially between a first (upper) surface 160 and a second (lower) surface 168. The axial opening 170 extends between the surfaces 160, 168. The undercut 176 is formed in the axial opening 170 to provide a gap or void that effectively widens a portion of the opening 170 at a position spaced from the termination of the opening 170. As in FIG. 1, the plunger 122 is illustrated as including the bore 172, such that the central opening 170 terminates at the offset surface 174. In this example, the undercut is spaced from the offset surface 174. When the offset surface 174 is not provided, the undercut 176 may be spaced from the lower surface 168.

At an operation 210, the process 200 includes positioning the shaft relative to the plunger. In an example 212 accompanying the operation 210, the shaft 118 is illustrated as being inserted into the axial opening 170 of the plunger 122. Specifically, a portion of the shaft 118 extends through the axial opening 170 and the second end 126 of the shaft 118 extends from the axial opening 170. As shown by the arrow 214 in the example 212, the plunger can be moved axially relative to the shaft 118. For example, the plunger 122 may be positioned relative to the shaft 118 such that the head 139 is a predetermined distance from the upper surface 160 of the plunger 122.

Although not illustrated in the example 212, additional components may be provided on the shaft 118. For example, one or more of the return spring 158 and/or the alignment plug 152 may be positioned on the shaft 118, e.g., between the head 139 and the upper surface 160 of the plunger 122. When the return spring 158 is present, the operation 210 can include positioning the plunger 122 at a position relative to the shaft 118 that compresses the return spring 158 to a predetermined pressure. Aspects of the coupler 120 and/or the movable contact 114 also are omitted from the example 212, but may be present. In examples, the operation 210 can include positioning the plunger 122 on the shaft 118 relative to any surface and/or to provide any desired effect or configuration.

Because the plunger 122 can be positioned anywhere along the shaft 118, prior to fixing the plunger 122 and the shaft 118, aspects of this disclosure may allow for improved dimension control during assembly. For example, the position of the plunger 122 may be set relative to a desired datum surface, which will be the same for each assembly, regardless of variations in tolerances in parts. By achieving this consistent positioning, aspects of this disclosure can provide improved control over spring compression, e.g., of the return spring 158.

At an operation 216, the process 200 includes altering the shaft to form a flared head and to cause shaft material to displace into undercut to fix the plunger to the shaft. An example 218 accompanying the operation 216 shows the result of the operation 216. Specifically, the example 218 shows the flared head 178 and the expanded portion 180 of the shaft 118. The expanded portion 180 cooperates with the undercut 176 to prevent (under normal operating conditions) relative movement of the shaft 118 and the plunger 122.

The operation 216 can include performing a cold forming process as the altering operation. For example, the shaft 118 may be sufficiently malleable that the second end 126 of the shaft 118 can be deformed with appropriate tooling to form the flared head 178. In examples, the operation 216 can include radial forming, orbital forming, or other forming of the flared head 178. Contemporaneously with forming the flared head 178, the shaft 118 also is deformed such that a portion of the shaft 118 extends into the undercut 176, forming the extended portion 180. In examples in which the operation 216 includes radial or orbital forming, such processes will also cause the localized deformation of the shaft 118 that creates the extended portion. In other examples, the shaft 118 may be altered using other manufacturing processes, including but not limited to other forming process, machining processes, and/or the like. Any process that results in the shaft 118 expanding at least partially into the undercut 176 and/or that widens the second end 126 of the shaft 118 to prevent passage through the plunger 122 may be used.

In the example of FIGS. 1 and 2, the flared head 178 is formed in the bore 172, e.g., such that the flared head 178 is spaced from the lower surface 168 of the plunger 122. In this manner, the flared head 178 does not protrude to effectively increase a length of the plunger 122. However, in other examples in which the bore 172 is not provided, the flared head 178 may protrude from the lower surface 168.

Figure 3:
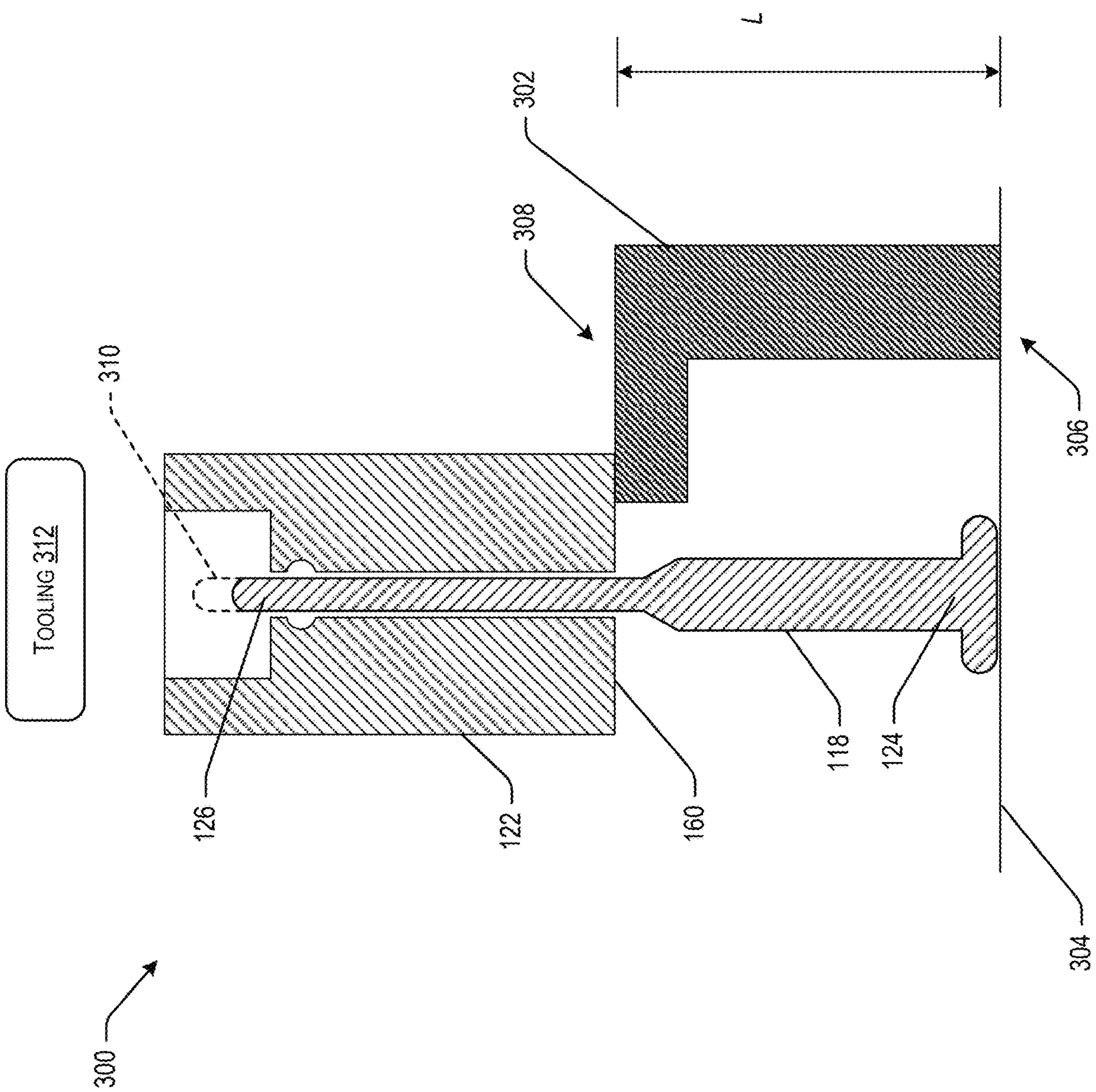
FIG. 3 is a cross-sectional view showing aspects of assembling an actuator assembly including a plunger and a shaft, in accordance with aspects of this disclosure.

FIG. 3 is a cross-sectional view of a sample tooling arrangement 300 that may be used according to aspects of this disclosure. For example, the tooling arrangement 300 may be used to position the plunger 122 relative to the shaft 118 for forming or otherwise altering. In examples, the tooling arrangement 300 may be used in connection with the operation 210 and/or the operation 216 discussed above.

In more detail, FIG. 3 shows a spacer 302 disposed on a datum surface 304. The spacer 302 has a bottom surface 306 contacting the datum surface 304. The spacer 302 also has a support surface 308 spaced from the bottom surface 306 by a spacing distance, L. In the example, the spacer 302 is illustrated as being substantially L-shaped in cross-section, although this is for example only.

In operation, as illustrated in FIG. 3, the shaft 118 is arranged proximate the spacer 302 such that the first end 124 of the shaft 118 is disposed on the datum surface 304. Accordingly, the second end 126 of the shaft 118 extends above the support surface 308. The plunger 122 is then placed over the shaft 118, and the first, e.g., upper, surface 160 of the plunger rests on the support surface 308. In this example, the first surface 160 of the plunger 122 is thus spaced from the head of the shaft 118 by the spacing distance L.

With the plunger 122 positioned on the support surface 308, machine tooling 312 may be brought into contact with the second end 126 of the shaft 118 to affix the shaft 118 and the plunger 122 as detailed herein. For example, the machine tooling 312 can be used to perform the operation 216.

The dashed line 310 represents another example length of the shaft 118. As will be appreciated, the shaft 118 may be made with relatively loose or wide tolerances, which may result in shafts of varying lengths. Aspects of this disclosure allow for the plunger 122 to be moved relative to the shaft 118, such that when the shaft is a bit longer, e.g., in the example of the dashed line 310, the excess material may be altered in a manner that does not affect the spacing of the upper surface 160 relative to the first end 124 of the shaft 118. Of course, FIG. 3 is intended to show only one example of positioning the shaft 118 and the plunger 122 relative to each other for affixing. Other tooling may be provided that provides different datum and/or support surfaces. In examples, the upper surface 160 of the plunger 122 can be positioned relative to one or more other features of the actuator assembly 116, for instance. Also, only the shaft 118 and the plunger 122 are shown in FIG. 3. This is for clarity only, as other features may be placed on the shaft 118 prior to altering or working, including but not limited to the return spring 158 and/or the alignment plug 152.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A switching device comprising:
- a housing defining a volume;
- one or more fixed contacts disposed at least partially in the volume;
- a movable contact disposed in the volume;
- a shaft extending from a first end coupled to the movable contact to a second end;
- a plunger coupled to the second end of the shaft, the plunger comprising:
  - a first surface,
  - a second surface spaced from the first surface along an axis,
  - an axial opening extending from the first surface to the second surface and configured to receive the shaft, and
  - an undercut formed in an inner surface of the axial opening at a position spaced from the second surface such that a portion of the axial opening extends between the undercut and the second surface; and
- a coil proximate the plunger, the coil being configured to be selectively energized to alter a magnetic field and cause the plunger to move along the axis between a first position that configures the switching device in a closed configuration in which the movable contact contacts the one or more fixed contacts and a second position that configures the switching device in an open configuration in which the movable contact is spaced from the one or more fixed contacts,
- wherein the shaft extends at least partially into the undercut of the plunger to secure the plunger to the shaft.

2. The switching device of claim 1, wherein:
- the shaft is disposed in the axial opening;
- the second end of the shaft extends past the second surface of the plunger; and
- the second end of the shaft is altered to secure the shaft to the plunger.

3. The switching device of claim 2, wherein:
- the second end of the shaft is altered to form an increased diameter portion of the shaft proximate the second end; and
- the increased diameter portion is wider than the central opening.

4. The switching device of claim 3, wherein:
- the increased diameter portion of the shaft contacts the second surface of the plunger.

5. The switching device of claim 2, wherein:
- the second end of the shaft is altered to cause a portion of the shaft to extend into the undercut of the plunger.

6. The switching device of claim 2, wherein the second end of the shaft is secured to the plunger using a radial forming process.

7. An actuator assembly for an electrical device, the actuator assembly comprising:
- a shaft extending from a first end to a second end generally along an axis;
- a movable contact coupled to the first end of the shaft; and
- a plunger coupled to the second end of the shaft, the plunger comprising:
  - an axial opening extending through the plunger, and
  - an undercut formed in an inner surface of the axial opening at a position along the axial opening spaced from an end of the plunger such that a portion of the axial opening extends between the undercut and the end of the plunger, wherein:
- the shaft extends through the axial opening, and
- a portion of the shaft extends laterally into the undercut to secure the shaft and the plunger.

8. The actuator assembly of claim 7, wherein:
- the plunger comprises a body that extends along the axis from a first surface to a second surface; and
- the undercut is formed proximate the second surface.

9. The actuator assembly of claim 8, wherein:
- the second end of the shaft extends past the second surface of the plunger; and
- the second end of the shaft is altered to secure the shaft to the plunger proximate the second surface.

10. The actuator assembly of claim 9, wherein:

the second end of the shaft is altered to form an increased diameter portion of the shaft proximate the second end; and the increased diameter portion is wider than the axial opening.

11. The actuator assembly of claim 10, wherein:

the increased diameter portion of the shaft contacts the second surface of the plunger.

12. The actuator assembly of claim 9, wherein:

the second end of the shaft is altered to cause the portion of the shaft to extend into the undercut of the plunger.

13. The actuator assembly of claim 12, wherein the second end of the shaft is secured to the plunger using at least one of a radial forming process or an orbital forming process.

14. The actuator assembly of claim 8, wherein:

the plunger is secured to the shaft with the first surface of the plunger at a predetermined distance from the first end of the shaft.

15. A method of forming an actuator assembly, the method comprising:

providing a shaft extending axially from a head and to an end;

providing a plunger, the plunger having a body, an axial opening extending through the body, and an undercut formed in an inner surface defining the axial opening, the undercut being disposed at a position along the axial opening spaced from an end of the plunger such that a portion of the axial opening extends between the undercut and an end of the plunger;

positioning the shaft relative to the plunger with the shaft extending through the axial opening; and altering the end of the shaft proximate the plunger, the altering forming an increased diameter portion proximate the end and causing a portion of the shaft to extend into the undercut.

16. The method of claim 15, wherein the positioning the shaft relative to the plunger comprises providing tooling that fixes a position of the plunger relative to the shaft along an axis of the shaft.

17. The method of claim 15, wherein the positioning of the shaft comprises fixing a position of the plunger relative to the head of the shaft.

18. The method of claim 15, wherein:

the body extends from a first surface to a second surface, the axial opening extends from the first surface to the second surface, and the undercut is formed proximate the second surface; and the end of the shaft extends from the second surface; and the altering the end of the shaft proximate the plunger causes the increased diameter portion to contact the second surface of the body of the plunger.

19. The method of claim 15, wherein the altering comprises performing a cold forming process on the end of the shaft.

20. The method of claim 19, wherein the altering comprises at least one of orbital forming or radial forming.

* * * * *